(12) United States Patent
Miessmer

(10) Patent No.: US 9,267,629 B2
(45) Date of Patent: Feb. 23, 2016

(54) HOSE CLAMP

(75) Inventor: Stefan Miessmer, Zurich (CH)

(73) Assignee: OETIKER SCHWEIZ AG, Horgen (CH)

( * ) Notice: Subject to any disclaimer, the term of this patent is extended or adjusted under 35 U.S.C. 154(b) by 0 days.

(21) Appl. No.: 14/354,767

(22) PCT Filed: Oct. 28, 2011

(86) PCT No.: PCT/EP2011/005454
§ 371 (c)(1),
(2), (4) Date: May 19, 2014

(87) PCT Pub. No.: WO2013/060346
PCT Pub. Date: May 2, 2013

(65) Prior Publication Data
US 2014/0259547 A1 Sep. 18, 2014

(51) Int. Cl.
F16L 33/02 (2006.01)
F16L 33/025 (2006.01)
F16L 33/035 (2006.01)

(52) U.S. Cl.
CPC .............. F16L 33/02 (2013.01); F16L 33/025 (2013.01); F16L 33/035 (2013.01); Y10T 24/1414 (2015.01)

(58) Field of Classification Search
CPC ....... F16L 33/035; F16L 33/025; F16L 21/00; F16L 33/04; F16L 33/02; Y10T 24/1478; Y10T 24/1457; Y10T 24/148; Y10T 24/1482; Y10T 24/1412; Y10T 24/1488; Y10T 24/1469; Y10T 24/1461; Y10T 24/152; Y10T 24/45246; Y10T 24/1441; Y10T 24/1414

USPC ............ 24/19, 20 R, 20 CW, 20 TT, 268, 270
See application file for complete search history.

(56) References Cited

U.S. PATENT DOCUMENTS

| 1,804,725 | A |   | 5/1931  | Walker |              |
|-----------|---|---|---------|--------|--------------|
| 1,965,207 | A | * | 7/1934  | Walker | ......... 24/20 TT |
| 3,078,532 | A |   | 2/1963  | Bywater |             |
| 3,293,709 | A | * | 12/1966 | Holton | ......... 24/20 TT |
| 4,053,985 | A |   | 10/1977 | Spentzas |           |
| 4,183,120 | A | * | 1/1980  | Thorne | .......... 24/16 R |
| 4,214,351 | A | * | 7/1980  | Wenk   | ........... 24/16 PB |
| 4,222,155 | A | * | 9/1980  | Oetiker | .......... 24/20 R |
| 4,299,012 | A |   | 11/1981 | Oetiker |            |
| 4,468,840 | A | * | 9/1984  | Sauer et al. | .... 24/20 R |
| 4,483,556 | A | * | 11/1984 | LiVolsi | ........... 285/252 |
| 4,543,691 | A | * | 10/1985 | Calmettes | ...... 24/20 R |

(Continued)

FOREIGN PATENT DOCUMENTS

CH 580779 A5 10/1976
EP 0429274 A2 5/1991

OTHER PUBLICATIONS

Search Report and Written Opinion for International Patent Application No. PCT/EP2011/005454; Jul. 6, 2012.

Primary Examiner — Robert J Sandy
Assistant Examiner — David Upchurch
(74) Attorney, Agent, or Firm — Barnes & Thornburg LLP

(57) ABSTRACT

An open hose clamp with a tightening mechanism in the form of a so-called Oetiker ear. The tightened condition is locked by toothed portions which mutually engage outside the area of the ear on the side of the ear remote from the outer clamping band end. In the locked tightened condition, the ear is free of forces so that the hose clamp retains its clamping function even if the outward projecting ear is damaged.

9 Claims, 5 Drawing Sheets

(56) References Cited

U.S. PATENT DOCUMENTS

| | | | |
|---|---|---|---|
| 4,547,953 A * | 10/1985 | LiVolsi | 29/453 |
| 5,070,579 A * | 12/1991 | Hirabayashi | 24/20 R |
| 6,247,206 B1 * | 6/2001 | Craig, Jr. | 24/20 R |
| 6,467,132 B1 * | 10/2002 | Robley | 24/16 PB |
| 7,093,326 B2 * | 8/2006 | Meier et al. | 24/20 R |
| 2009/0158559 A1 * | 6/2009 | Chardon et al. | 24/16 PB |

* cited by examiner

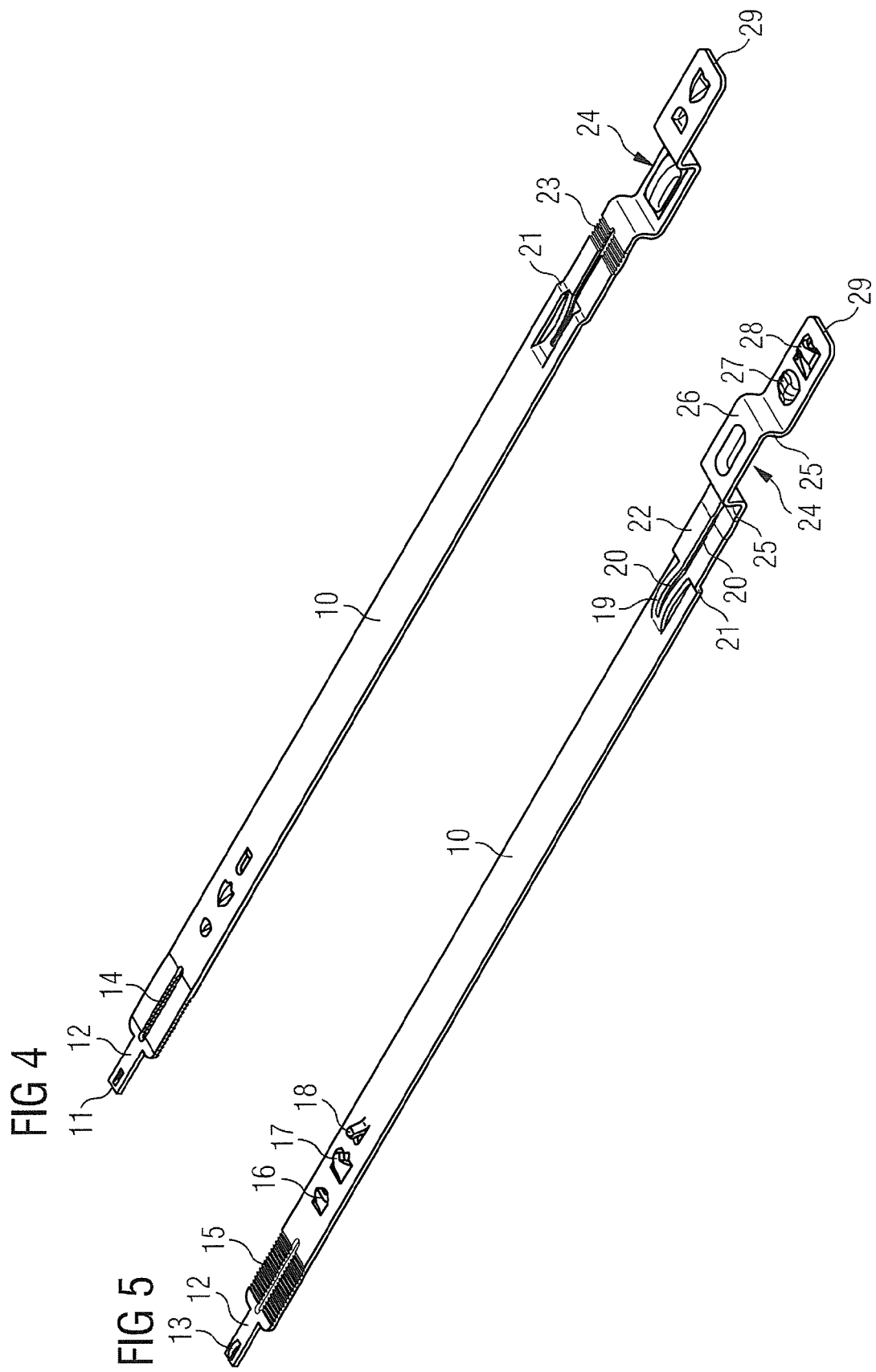

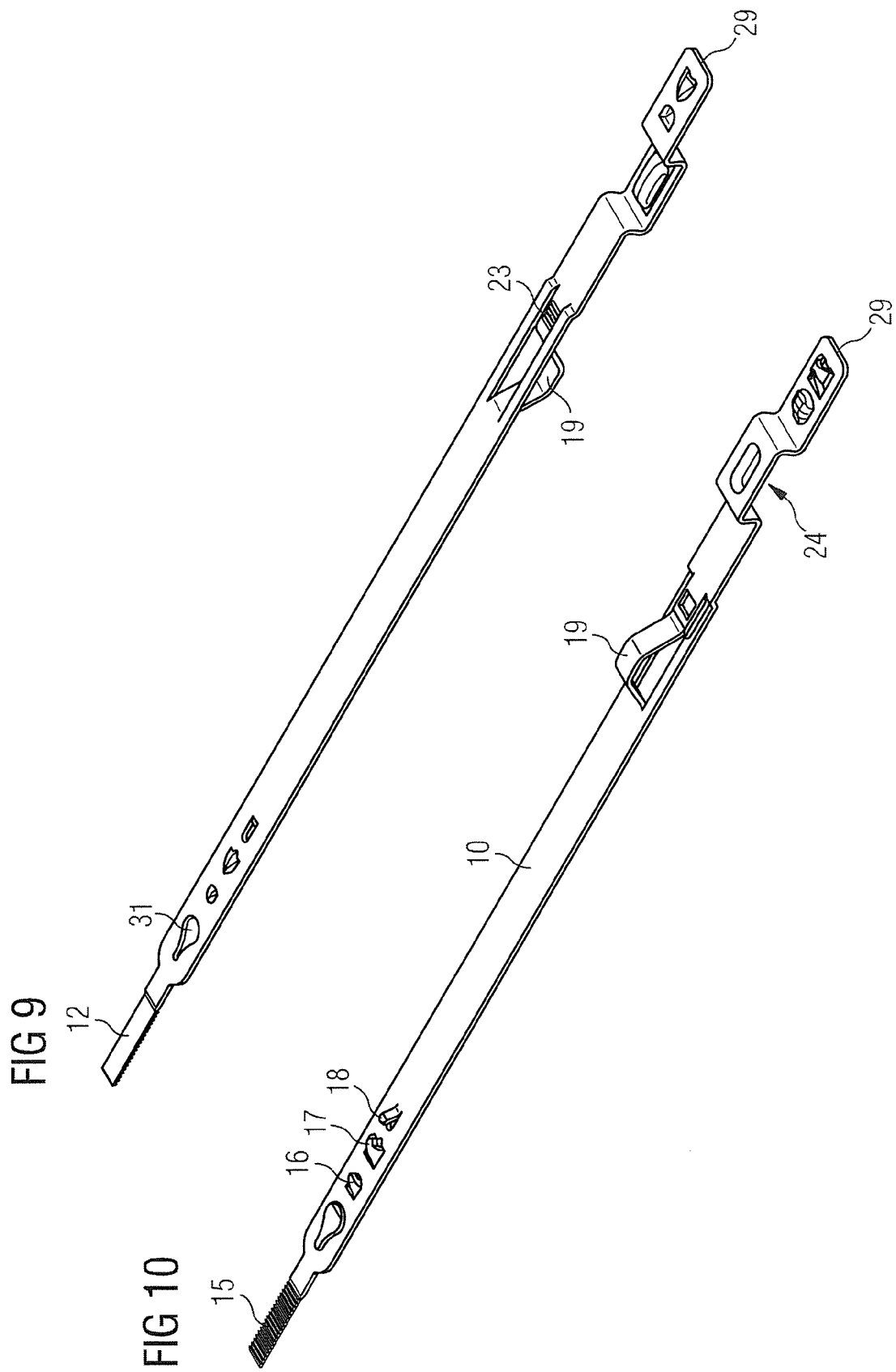

HOSE CLAMP

PRIORITY CLAIM

This patent application is a U.S. National Phase of International Patent Application No. PCT/EP2011/005454, filed 28 Oct. 2011, the disclosure of which is incorporated herein by reference in its entirety.

BACKGROUND

An open hose clamp is known from U.S. Pat. No. 4,299,012. There, an ear-shaped tightening means has the purpose of holding the clamp in that tightened condition which is given the clamp when it is mounted on the object to be clamped.

U.S. Pat. No. 4,053,985 discloses an open hose clamp in which the end sections of a clamping band are provided with toothed areas for mutual engagement in the overlapping condition. A clip, which is not explained in detail, has the function of holding the end portions in mutual engagement. Such a clip is known from U.S. Pat. No. 3,078,532. U.S. Pat. No. 1,804,725 describes another hose clamp in which a first toothed area provided at the outer side of a tongue co-operates with a second toothed area provided at the inner side of a raised portion. All these hose clamps with tooth engagement can be tightened when mounted by pulling the free outer end of the clamping band.

SUMMARY

Disclosed embodiments overcome those shortcomings which occur in comparable prior art hose clamps. Disclosed embodiments provide a hose clamp which can be tightened in a simple way to the desired holding force and which safely maintains this holding force in the mounted condition.

BRIEF DESCRIPTION OF THE DRAWINGS

Disclosed embodiments will be explained in more detail below with reference to the drawings, in which:

FIGS. 4 and 5 are perspective views of the hose clamp of FIG. 1 in a stretched condition, seen from the sides which in the closed condition are the inner and, respectively, outer clamping band side;

FIGS. 8 to 10 are representations similar to FIGS. 1, 4 and 5 of a hose clamp according to another disclosed embodiment;

DETAILED DESCRIPTION OF THE DISCLOSED EMBODIMENTS

Figure 3:
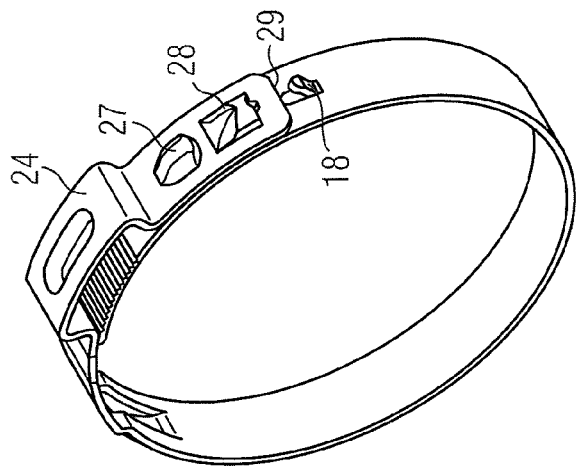
FIGS. 2 and 3 are perspective views of the hose clamp of FIG. 1, seen from opposite sides.

Disclosed embodiments provide a hose clamp wherein the ear-shaped tightening means has the sole function of tightening during mounting, which can be done manually or with a tool common with ear clamps, e.g. a plier-type tool, which readily permits achieving high holding forces. In the mounted condition, the holding forces produced during tightening are taken up by the mutually engaging toothed areas, while the ear is relieved of forces. Because the toothed areas, which act as a locking mechanism, are disposed outside the area of the ear, the mounted hose clamp is capable of safely fulfilling its function even if the outward projecting ear is damaged.

The double toothing recited in claim 2 has the advantage that lower stamping pressure is needed for stamping the teeth.

The disclosed embodiment of claims 3 to 5 results in a hose clamp that is good to handle and has no outward projecting clamping band end.

The closing means recited in claim 6 achieves a secure mutual guidance of the two clamping band ends in the longitudinal direction.

The disclosed embodiment of claims 7 and 8 serves to counteract any widening of the mounted clamp, which may be due to material fatigue.

Further features which improve the practical use and handling of the hose clamp are set forth in claims 10 and 11.

The hose clamp shown in FIGS. 1 to 7 consists of a clamping band 10 which has the following elements, starting from upper left end 11 in FIGS. 4 and 5: a tongue 12 which has a width smaller than the full width of the clamping band 10 and carries a guide nose 13; a first toothed portion 15 divided by a slot 14 and facing outward in the radial direction of the closed clamp; a projection in the form of a support hook 16; a guide hook 17; an integrated securing hook 18 to prevent unintended opening of the clamp; a cover portion 19 bent out of the clamping band and having a guide slot 20 extending in the longitudinal direction of the clamping band 10; a raised portion 22 which starts at the end of the cover portion 19 at a step 21, in which the guide slot 20 continues and which has a second toothed portion 23 facing inward in the radial direction of the closed clamp; a tightening means 24 in the form of a so-called "Oetiker ear" 24 having two radially outward extending legs 25 and a bridge portion 26 interconnecting the outer ends of the legs; a depression 27 forming a support hook receiving means, a guide hook receiving means 28; and an outer clamping band end 29.

Due to the longitudinal slot 14 provided in the area of the first toothed portion 15, the stamping pressure required for forming the teeth may be made smaller.

The hose clamp, which is supplied in its closed condition, is axially positioned on the object to be clamped, e.g. a pipe nipple onto which the end of a hose is slid. Subsequently, the hose clamp is tightened by narrowing the ear 24 by means of an automatic or manual tightening tool, e.g. a pair of pliers engaging both legs 25, whereby both toothed portions 15 and 23 are brought into engagement. This engagement causes a locking of the hose clamp in the tightened condition in which the ear 24, which is now outside of the tightening area, is relieved. Even when the outward projecting ear becomes damaged this no longer affects the holding force of the hose clamp.

Figure 2:
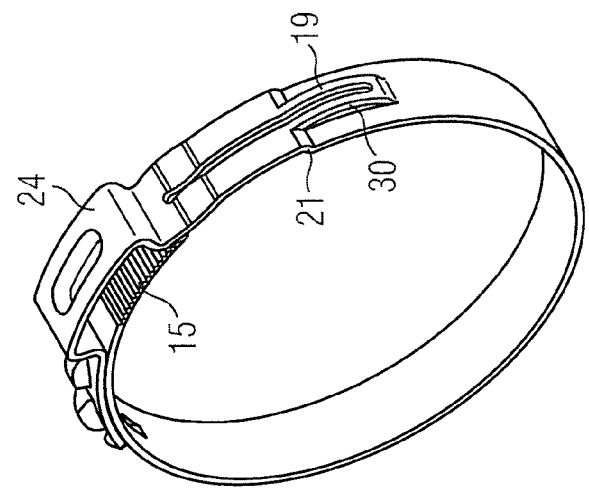
Figure 1:
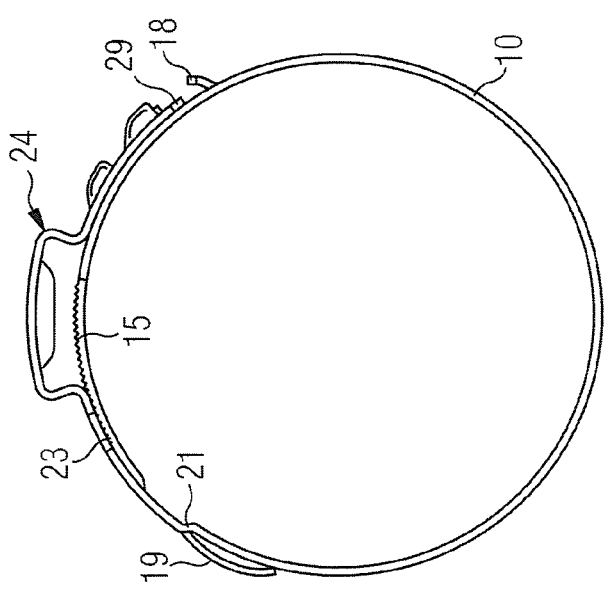
FIG. 1 is a side view of a hose clamp in accordance with a first disclosed embodiment, shown in a closed but not yet tightened condition.
Figure 6:
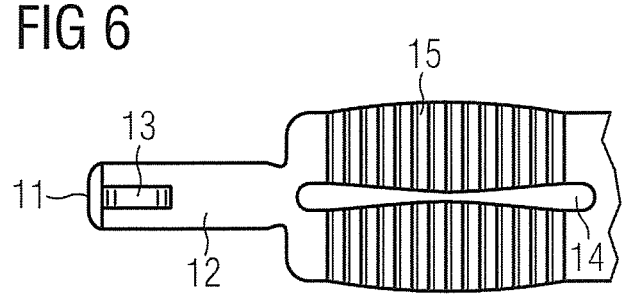
FIGS. 6 and 7 are enlarged plan views of parts of the hose clamp of FIGS. 1 to 5.

In the closed condition of the hose clamp shown in FIGS. 1 to 3, the guide nose 13 provided on the inner clamping band end 11 is at the beginning of the guide slot 20 within the raised portion 22. During the tightening process proper, the tongue 12 moves into the area below the cover portion 19 where it remains guided by the guide slot 20 provided therein until the subsequent full-width part of the clamping band arrives near the step 21. In this condition, the object to be clamped is surrounded substantially throughout its circumference by the full width of the hose clamp with no gaps or steps.

Figure 7:
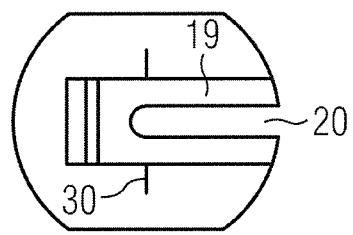

As shown in FIGS. 2 and 7, the clamping band may be provided with a marking 30 at the guide slot 20 laterally of the cover portion 19 for indicating the position of the guide nose 13, thus forming a visual indication of the tightening condition of the hose clamp.

Figure 8:
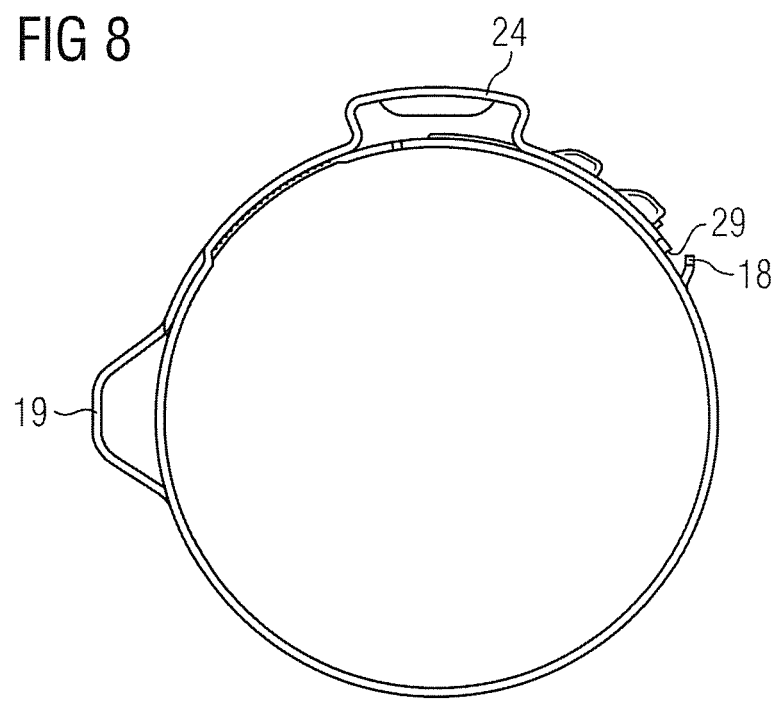

The disclosed embodiment of FIGS. 8 to 10 differs from that of FIGS. 1 to 7 in that the first toothed portion 15 is formed at the inner clamping band end on the tongue 12 and the second toothed portion 23 has a correspondingly larger distance from the ear 24. In this disclosed embodiment, which is particularly suitable for clamps of larger diameters, the clamping means (ear 24) and the locking means (toothed portions 15, 23) are well separated so that any unintended unlocking is safely prevented.

Further, a drop-shaped depression 31 which is open on its radially inner side is provided within the tightening area. The circumference of the depression 31 is completely inside the clamping band, and the width decreases from the centre of the clamping band as viewed in the longitudinal direction of the band. As shown in the disclosed embodiment of FIG. 11, the border of the depression 31 may be reinforced by a circumferential bead 32. During the tightening of the hose clamp, the material of the object to be clamped (hose) is pressed into the depression and, during opposite movement, is urged into the tapered part of the drop shape, thereby inhibiting any movement in that direction. This opposes any relaxation of the tightened condition as may occur due to plastic deformation of the clamping band.

In accordance with FIGS. 8 to 10, the cover portion 19 for the tongue 12 is strongly bent out of the clamping band 10 to safely accommodate a longer tongue end, as results from a larger tightening range.

Figure 11:
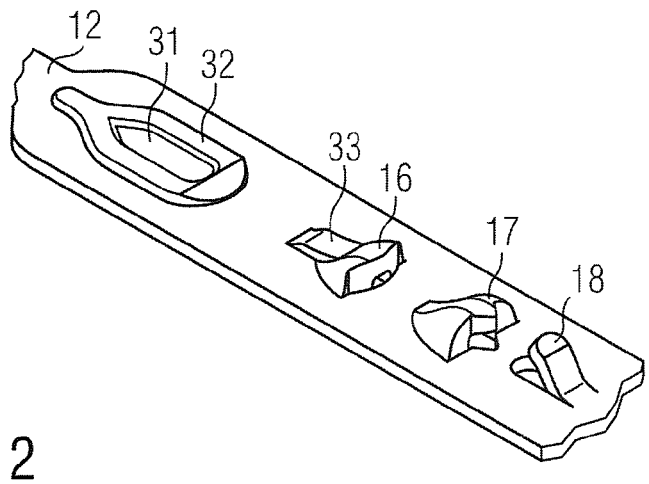
FIG. 11 is an enlarged view of part of the clamp shown in FIG. 10.
Figure 12:
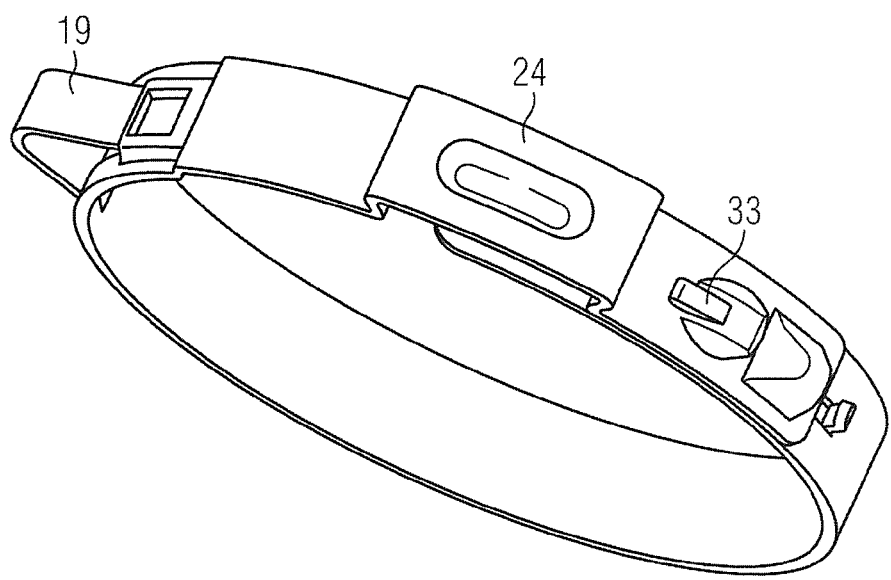
FIGS. 12 and 13 are enlarged representations for explaining a detail.
Figure 13:
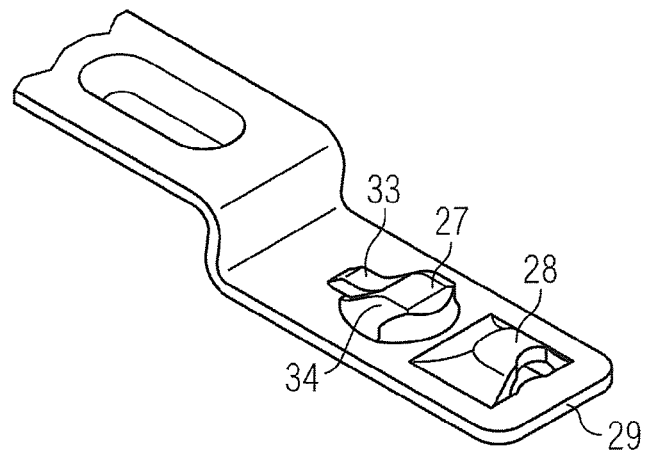

In the alternative of FIGS. 11 to 13, the support hook 16 is provided with a guide finger 33 which, in the closed condition of the hose clamp, engages a cut-out 34 of the support hook receiving means 27 and is open toward the ear 24. This provides a guide for the inner clamping band end 11 in the circumferential direction of the hose clamp even if there is no guide nose 13 on the tongue as in the first disclosed embodiment. This concept is particularly suited for the disclosed embodiment of FIGS. 8 to 10.

The feature explained with reference to FIGS. 1 and 7 (marking of the tightening condition) may be provided in all of the disclosed embodiments and alternatives described hereinabove. Similarly, the feature for guiding the inner clamping band end explained with reference to FIGS. 11 to 13 can be adopted in the disclosed embodiments of FIGS. 1 to 7 and 8 to 10. Further, the feature of FIGS. 9, 10 and 11 (drop shaped embossment) for preventing a reduction in the clamping effect may be employed in all disclosed embodiments.

REFERENCE NUMBERS 10 clamping band
11 inner clamping band end
12 tongue
13 guide nose
14 longitudinal slot
15 first toothed portion
16 support hook
17 guide hook
18 securing hook
19 cover portion
20 guide slot
21 step
22 raised portion
23 second toothed portion
24 ear
25 legs
26 bridge portion
27 support hook receiving means
28 guide hook receiving means
29 outer clamping band end
30 marking
31 depression
32 bead
33 guide finger
34 cut-out

The invention claimed is:

1. A hose clamp made of a clamping band having an inner end portion overlapped by an outer end portion, closing means for maintaining both end portions in mutual engagement in the closed condition of the hose clamp, and ear-like tightening means provided in the clamping band and having a pair of outward extending legs interconnected by a bridge portion, wherein the outer side of the inner end portion has a first toothed portion which in the tightened condition of the hose clamp engages a second toothed portion disposed on the inner side of the outer end portion and on the side of the tightening means remote from the outer clamping band end,
  wherein the inner end portion terminates in a tongue which has a width smaller than the full band width and which, in the closed condition of the hose clamp, extends through a step provided in the outer end portion,
  wherein the outer end portion has a part covering the outer side of the tongue in an area adjoining the step, and
  wherein, in the tightened condition of the clamp, the engagement between the toothed portions takes place outside the ear-like tightening means.

2. The hose clamp of claim 1, wherein at least one of the toothed portions is formed in a part of the clamping band that is divided by a longitudinal slot.

3. The hose clamp of claim 1, wherein the first toothed portion is formed on the tongue.

4. The hose clamp of claim 1, wherein the closing means has at least one depression formed on the outer end portion and a projection formed on the inner end portion and engaging the depression in the closed condition of the hose clamp, the depression having a cut-out open toward the tightening means for engaging a guide finger formed on the projection.

5. The hose clamp of claim 1, wherein the inner side of the clamping band has a depression which, in the closed condition, comes to lie on the hose, the periphery of which is completely within the clamping band and which has a width decreasing from the centre of the clamping band in the longitudinal direction of the band.

6. The hose clamp of claim 5, wherein the periphery of the depression is reinforced by a circumferential bead.

7. The hose clamp of claim 1, wherein the tongue carries a guide nose for engaging a guide slot provided in the outer end portion.

8. The hose clamp of claim 7, wherein a marking is provided at the guide slot for observing the closing condition of the hose clamp.

9. The hose clamp of claim 1, wherein the outer side of the clamping band has a securing hook for the outer clamping band end to prevent an inadvertent opening of the hose clamp.

* * * * *